(12) United States Patent
Abadi et al.

(10) Patent No.: US 10,055,329 B2
(45) Date of Patent: Aug. 21, 2018

(54) DETECTION OF ANTIPATTERNS THROUGH STATISTICAL ANALYSIS

(71) Applicant: International Business Machines Corporation, Armonk, NY (US)

(72) Inventors: Aharon Abadi, Petach Tikva (IL); Moria Abadi, Petach Tikva (IL); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/870,134

(22) Filed: Sep. 30, 2015

(65) Prior Publication Data

US 2017/0091073 A1    Mar. 30, 2017

(51) Int. Cl.
*G06F 9/44* (2018.01)
*G06F 11/36* (2006.01)
*G06F 8/00* (2018.01)

(52) U.S. Cl.
CPC ............ *G06F 11/3616* (2013.01); *G06F 8/00* (2013.01); *G06F 11/3608* (2013.01)

(58) Field of Classification Search
None
See application file for complete search history.

(56) References Cited

U.S. PATENT DOCUMENTS

| | | | |
|---|---|---|---|
| 6,851,105 B1* | 2/2005 | Coad | G06F 8/20 |
| | | | 717/106 |
| 7,818,723 B2 | 10/2010 | AliKacem et al. | |
| 9,535,664 B1* | 1/2017 | Foster | G06F 8/33 |
| 2006/0053422 A1* | 3/2006 | Alikacem | G06F 11/3668 |
| | | | 718/100 |
| 2008/0134135 A1* | 6/2008 | Elaasar | G06F 8/75 |
| | | | 717/104 |

(Continued)

OTHER PUBLICATIONS

Parsons, Trevor, and John Murphy. "Detecting Performance Antipatterns in Component Based Enterprise Systems." Journal of Object Technology, vol. 7, No. 3, Mar. 2008, pp. 55-90, www.jot.fm/issues/issue_2008_03/article1.pdf. Accessed May 8, 2017.*

(Continued)

*Primary Examiner* — Wei Zhen
*Assistant Examiner* — Binh Luu

(57) ABSTRACT

A computer implemented method of detecting code antipatterns, comprising:
1) Receiving a code containing one or more of a plurality of code segments, each one of the one or more code segments includes one or more of a plurality of patterns.
2) Automatically analyzing each one of the one or more code segment to create an array of a plurality of features vectors, each one of the plurality of features vectors maps a plurality of predefined features found in one or more patterns.
3) Matching each one of the plurality of features vectors with a plurality of template features vectors each representing one of a plurality of antipatterns, the plurality of template features vectors is stored in an antipatterns dataset.
4) Determining a presence or an absence of each of the plurality of antipatterns within each of the one or more code segments according to the matching.

22 Claims, 3 Drawing Sheets

(56) References Cited

U.S. PATENT DOCUMENTS

| | | | |
|---|---|---|---|
| 2009/0048690 A1* | 2/2009 | Miller | G06N 5/04 |
| | | | 700/54 |
| 2009/0049376 A1* | 2/2009 | Miller | G05B 19/042 |
| | | | 715/273 |
| 2010/0042974 A1 | 2/2010 | Gutz et al. | |
| 2011/0078106 A1 | 3/2011 | Luchi et al. | |
| 2011/0265064 A1* | 10/2011 | Hadar | G06F 17/30985 |
| | | | 717/121 |
| 2015/0082290 A1* | 3/2015 | Peled | G06F 8/51 |
| | | | 717/137 |
| 2015/0347750 A1* | 12/2015 | Lietz | G06F 21/577 |
| | | | 726/23 |
| 2015/0363299 A1* | 12/2015 | Ekambaram | G06F 11/3664 |
| | | | 714/38.1 |
| 2016/0188435 A1* | 6/2016 | Abadi | G06F 8/443 |
| | | | 717/106 |
| 2016/0378648 A1* | 12/2016 | Ekambaram | G06F 11/3692 |
| | | | 714/38.1 |
| 2017/0329694 A1* | 11/2017 | Yoon | G06F 11/3608 |

OTHER PUBLICATIONS

Kaur, Harvinder, and Puneet Jai Kaur. "A Study on Detection of Anti-Patterns in Object-Oriented Systems." International Journal of Computer Applications, vol. 93, No. 5, May 2014, pp. 25-28, research.ijcaonline.org/volume93/number5/pxc3895514.pdf. Accessed May 13, 2017.*

Hecht, Geoffrey, et al. "Detecting Antipatterns in Android Apps." HAL Archives-Ouvertes, Mar. 6, 2015, hal.inria.fr/hal-01122754v2/document. Accessed May 13, 2017.*

Roussey, Catherine, and Ondrej Zamazal. "Antipattern Detection: How to Debug an Ontology without a Reasoner." CEUR Workshop Proceedings, vol. 999, No. 4, May 27, 2013, pp. 45-56, ceur-ws.org/Vol-999/paper4.pdf. Accessed May 13, 2017.*

Geoffrey Hecht et al., "Detecting Antipatterns in Android Apps", Research Report N° 8693, Mar. 2015, Project-Teams Spirals, Submitted on Mar 6, 2015.

Lukasz Pulawski., "Automatic Forecasting of Design Anti-patterns in Software Source Code", CS&P, vol. 928 of CEUR Workshop Proceedings, p. 312-323. CEUR-WS.org, (2012).

* cited by examiner

DETECTION OF ANTIPATTERNS THROUGH STATISTICAL ANALYSIS

FIELD AND BACKGROUND OF THE INVENTION

The present invention, in some embodiments thereof, relates to detecting software antipatterns, and, more specifically, but not exclusively, to detecting software antipatterns through statistical analysis.

As technology advances and software intensive application become more abundant, software development is being done by a rapidly growing number of programmers who may have limited experience and may not be fully familiar with proper software development practices. Moreover, a lot of software practices used in certain environments, for example, Object Oriented Programming (OOP), web and/or server, may not fit platforms and applications of other nature, for example mobile platforms and/or Internet of Things (IoT). However software development practices may often be migrated from one software development environment to another. This migration may not be optimal at best and ineffective and/or harmful at worst.

A software product presents a complete life cycle including development, debugging, integration, verification, deployment, upgrade and maintenance. Efficiently supporting this life cycle naturally requires a robust design which follows good engineering practices to avoid failures, make proper use of resources, allow for scalability and support maintenance. Identifying poor programming at an early stage of the development process presents multiple benefits, for example, improving software code with respect to functionality and/or robustness, reduce implementation resources and/or reduce costs during one or more of the software product life cycle.

There exists a core population of software design experts in each of the software development environment, for example, OOP, web, server, mobile and/or IoT who may be well aware of software patterns (software development practices) implemented within software code and may be able to identify antipatterns within this code. This common knowledge base may also recommend proper software programming patterns during the software development process.

It is therefore highly desirable to harness the knowledge base shared by the community of software development experts to create automated tools for identifying antipatterns in software products.

SUMMARY OF THE INVENTION

According to some embodiments of the present invention there are provided methods and systems for detecting code antipatterns, comprising of receiving a code containing one or more code segments each including one or more pattern, automatically analyzing each of the code segments to create an array of a plurality of features vectors each mapping a plurality of predefined features found in the one or more pattern, matching each of the features vectors with a plurality of template features vectors each representing one of a plurality of antipatterns and determining a presence or an absence of each of the antipatterns within each of the code segments according to the matching. The plurality of template features vectors is stored in an antipatterns dataset.

Optionally, one or more identified antipatterns in the code segments are replaced with one or more approved patterns. The approved one or more patterns exhibit a similar functional behavior as the antipattern. The one or more approved patterns are retrieved from an approved patterns dataset comprising one or more approved patterns.

Optionally, the one or more template features vectors are created through statistical analysis of a plurality of previous patterns having functional characteristics similar to the one or more patterns. The plurality of previous patterns is stored in a previous patterns dataset.

Optionally, the one or more template features vectors are created using feedback of one or more other software developers who performed code review over the one or more patterns and identifies the one or more antipatterns.

Optionally, the one or more template features vectors are created through analysis of a log which holds a history of one or more changes performed to the one or more patterns to determine whether the one or more pattern is an antipattern.

Optionally, the one or more template features vectors are created through analysis of a log that holds a history of one or more changes made to the one or more patterns by two or more software developers to determine whether the one or more patterns are antipattern(s).

Optionally, the matching employs voting between one or more matching algorithms employing a different method of comparing each of the features vectors with the template features vectors.

According to some embodiments of the present invention there is provided a system for detecting code antipatterns, comprising of an interface for communicating with a user, a program store storing a code and a processor coupled to the first interface and the program store for implementing the stored code. The code comprises, code instructions for receiving a code having a plurality of code segments each includes one or more patterns, code instructions for automatically analyzing each of the code segments to create an array consisting of a plurality of features vectors each mapping a plurality of predefined features found in one of the patterns, code instructions for comparing each of the features vectors with a plurality of template features vectors each representing an antipattern and code instructions for determining a presence or an absence of one or more antipatterns within the code segments according to the comparison. The code is received according to a user input received via the interface. The plurality of template features vectors is stored in an antipatterns dataset.

Optionally, the processor is adapted for implementing the following code instructions in the code stored, code instructions for identifying one or more approved pattern to replace one or more of the antipatterns detected in the code segment. The one or more approved pattern exhibits a similar functional behavior as the one or more antipattern. The one or more approved patterns are retrieved from an approved patterns dataset comprising one or more approved patterns.

Optionally, the processor is adapted for implementing the following code instructions in the code stored, code instructions for creating one or more of the template features vectors through statistical analysis of a plurality of previous patterns having functional characteristics similar to the one or more pattern. The plurality of previous patterns is stored in a previous patterns dataset.

Optionally, the processor is adapted for implementing the following code instructions in the code stored, code instructions for creating the one or more template features vectors using feedback of one or more other software developer who performed code review over the one or more patterns and identifies the one or more antipatterns.

Optionally, the processor is adapted for implementing the following code instructions in the code stored, code instructions for creating the one or more template features vectors through analysis of a log which holds a history of one or more changes performed to the one or more patterns in order to determine whether the one or more patterns is an antipattern.

Optionally, the processor is adapted for implementing the following code instructions in the code stored, code instructions for creating the one or more template features vectors through analysis of a log which holds a history of one or more changes made to said at least one pattern by two or more software developers to determine whether the one or more patterns is an antipattern.

According to some embodiments of the present invention there is provided a computer program product for detecting code antipatterns, comprising of a non-transitory computer readable storage medium, a first program instructions to receive a code that includes one or more code segments each includes one or more patterns, a second program instructions to analyze each of the code segments to create an array consisting of a plurality of features vectors each mapping a plurality of predefined features found in one of the patterns, a third program instructions to match each of the features vectors with a plurality of template features vectors each representing one of a plurality of antipatterns and a fourth program instructions to determine a presence or an absence of each of the antipatterns within the code segments according to the match. The plurality of template features vectors is stored in an antipatterns dataset. The first, second, third and fourth program instructions are stored on the non-transitory computer readable storage medium.

Optionally, the computer program product comprises a fifth program instruction to calculate one or more approved pattern to replace one or more of the antipatterns detected in the code segment. The one or more approved pattern exhibits a similar functional behavior as the one or more antipatterns. The one or more, approved patterns are retrieved from an approved patterns dataset comprising one or more approved pattern. The fifth program instruction is stored on the non-transitory computer readable storage medium.

Optionally, the computer program product comprises a sixth program instruction to create one or more of the template features vectors through statistical analysis of a plurality of previous patterns having functional characteristics similar to the one or more patterns. The plurality of previous patterns is stored in a previous patterns dataset. The sixth program instruction is stored on the non-transitory computer readable storage medium.

Optionally, the code instructions for creating the one or more template features vectors use feedback of one or more other software developer who performed code review over the one or more patterns.

Optionally, the code instructions for creating the one or more template features vectors analyzes a log which holds a history of one or more changes performed to the one or more patterns in order to determine whether the one or more patterns are antipattern(s).

Optionally, the code instructions for creating the one or more template features vectors analyzes a log which holds a history of one or more changes made to the one or more patterns by two or more software developers to determine whether the one or more patterns are antipattern(s).

Optionally, the matching of the one or more patterns with the plurality of the antipatterns is done by voting between one or more matching algorithms. Each of the matching algorithms may employ a different method of comparing each of the features vector with the plurality of template features vectors.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
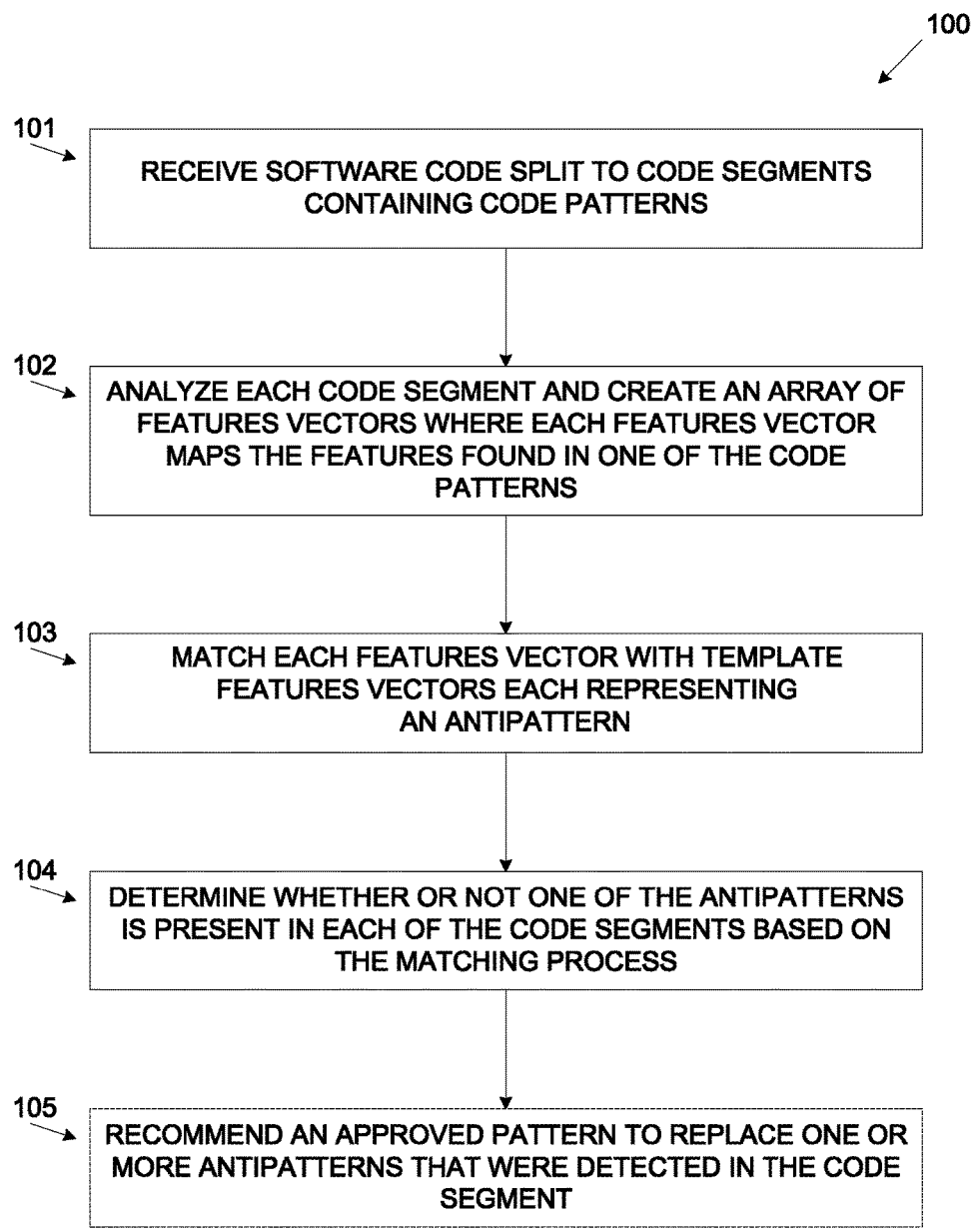
FIG. 1 is a flowchart of an exemplary process for detecting antipatterns in code, according to some embodiments of the present invention.

The present invention, in some embodiments thereof, relates to detecting software code antipatterns, and, more specifically, but not exclusively, to detecting software code antipatterns through statistical analysis.

According to some embodiments of the present invention, there are provided systems and methods for detecting code antipatterns (herein after "antipattern") which exist in software code using automated tools. A code of software split into one or more code segments each containing one or more code patterns (herein after "pattern") is received and analyzed where patterns refers to implementation instances within the code. The code segments and/or the code patterns may be implemented through a plurality of representations, for example, code, abstract syntax tree (AST), code abstraction, code XML representation and/or any software code abstraction and/or representation technique. The analysis, for example, static analysis, produces an array of features vectors where each features vector maps one or more predefined features detected in one of the patterns. Each predefined feature represents a property present in the pattern, for example, number and/or type of fields involved in the pattern, number of methods the pattern spans, number and/or type of AST nodes involved in the pattern, frameworks involved in the pattern, designated scope of the pattern, reachability from the enclosing scope of the pattern, global variables use, variable initialization states, escaped variables, etc. Each of the features vectors within the array is matched against a dataset containing a plurality of template features vectors each representing an antipattern to identify a correlation between each of the features vectors to any of the template feature vectors in order to detect whether an antipattern is present or not within each of the code segments. The antipatterns refer to an implementation instances that employ implementation practices that present one or more deficiencies, for example, ineffectiveness, non-robustness, resources (for example, time, power and/or computing power) waste and/or high complexity. Detecting antipatterns using an automated tool as described herein may allow detection of antipatterns at an early stage in the development process and may reduce costs and/or development time. As the code employs good engineering practices, it is less complex and/or more robust making code maintenance easier. In addition, induction of antipatterns into the code by programmers with limited experience and/or knowledge may be avoided.

The dataset of template features vectors (representing antipatterns) is created through statistical analysis of a plurality of other code segments over time and/or over a one or more of a plurality of software packages. The statistical analysis characterizes antipatterns and produces a template features vector representing the associated antipattern. The statistical analysis may analyze a plurality of patterns having similar functional and/or implementation characteristics and/or properties to characterize one or more antipatterns and generate one or more template feature vectors representing the one or more characterized antipatterns.

Optionally, one or more approved patterns which exhibit a similar functional and/or implementation as the one or more detected antipatterns is identified as a candidate to replace the one or more detected antipatterns. The one or more approved patterns are retrieved from an approved patterns dataset (database) which stores one or more approved patterns. The one or more approved patterns may be automatically included in the code segment to replace the antipattern. In the event the approved pattern(s) is automatically used to replace the antipattern(s), an indication may be provided to notify a user of the automatic replacement. The indication may further mark the approved pattern(s) and/or the antipattern(s) that was replaced.

Optionally, one or more of the template features vectors are created through code review performed by one or more software programmers reviewing one or more of the code segments and/or other code segments contained in other software packages in order to identify the one or more antipatterns.

Optionally, one or more of the template features vectors are created through inspection of a revision history of the code by analyzing one or more modifications made to the one or more of patterns in the code segment(s) in order to determine whether said at least one pattern is an antipattern.

Optionally, one or more of the template features vectors are created through inspection of the revision history of the code by analyzing the one or more modifications made to the one or more patters in the code segment(s) which may be done by two or more programmers in order to determine whether the one or more patterns is an antipattern.

Optionally, the matching of the one or more features vectors with each of the plurality of template features vectors is using one or more matching algorithms. Each matching algorithm may employ a different method for comparing and/or correlating each of the features vectors with the plurality of template features vectors. An antipattern may be identified through voting and/or selection among the results of the comparison done by the one or more matching algorithms.

According to some embodiments of the present invention, there is provided a computer program for detecting code antipatterns in software code. The computer program receives the code of software split into one or more code segments each containing one or more patterns. The computer program analyzes each of the code segments and creates an array containing a plurality of features vectors each associated with one or more patterns. Each features vector contains one or more features found in the associated pattern. The computer program then matches each one of the plurality of features vectors with template features vectors each representing one of a plurality of antipatterns. The matching includes correlating each of the one or more patterns with each one of a plurality of antipatterns by comparing their representations—the associated features vector and the plurality of template features vectors respectively. Based on the matching process the computer program detects the presence or absence of antipatterns in each of the code segments. In the event one or more antipatterns are detected in one or more of the code segments, the computer program may identify one or more approved patterns which may be a candidate to replace one or more of the detected antipatterns. The one or more approved patterns exhibit a similar functional and/or implementation as the one or more detected antipatterns. The one or more approved patterns are retrieved from an approved patterns dataset (database) which stores one or more approved patterns. The computer program may also serve as a platform for creating one or more of the plurality of template features vectors through for example, statistical analysis, guidelines outlined by one or more programmers, and/or inspection of history log(s) of one or more of the code segments.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for detecting antipatterns in code, according to some embodiments of the present invention.

As shown at 101, a process 100 for detecting antipattern in a code starts by receiving a software code which is split in one or more code segments each containing one or more patterns. The process 100 is repeated for each of the one or more code segments. The software code may be provided by one or more users using a user interface (UI) executed on an input module of a processing node integrating non-transitory medium for storing code instructions. The UI may be implemented through a plurality of human-machine interfaces, for example, text interface, graphical user interface (GUI) and/or audio interface. The code segments and/or the code patterns may be implemented through a plurality of representations, for example, code, abstract syntax tree (AST), code abstraction, code XML representation and/or any software code abstraction and/or representation technique.

As shown at 102, each of the code segments is analyzed through for example, static analysis to create an array of features vectors. Each features vector maps a predefined features found in one of the patterns included in the code segment. As discussed before each of the predefined features represent a property of the pattern, for example, number and/or type of fields involved in the pattern, number of methods the pattern spans, number and/or type of AST nodes involved in the pattern, frameworks involved in the pattern, designated scope of the pattern, reachability from the enclosing scope of the pattern, global variables use, variable initialization states, escaped variables, etc.

As shown at 103, each of the features vectors is matched (compared) against a dataset containing one or more of a plurality of template features vectors to find a correlation between the features vector and one of the template features vectors. Each of the template features vectors represents an antipattern. The matching may be done using one or more matching algorithms, each employing a different method for comparing and/or correlating each of the features vectors with the plurality of template features vectors.

As shown at 104, based on the matching of each of the features vectors in the array a decision is taken whether one or more antipatterns are present in the code segment.

As shown at 105, in case one or more antipatterns are detected, one or more approved pattern employing proper and/or approved implementation may be recommended to replace the one or more antipatterns detected in the code segment. The approved patterns are stored in a reference patterns dataset. The approved pattern may be automatically included in the code segment to replace the one or more antipatterns detected in the code segment.

Figure 2:
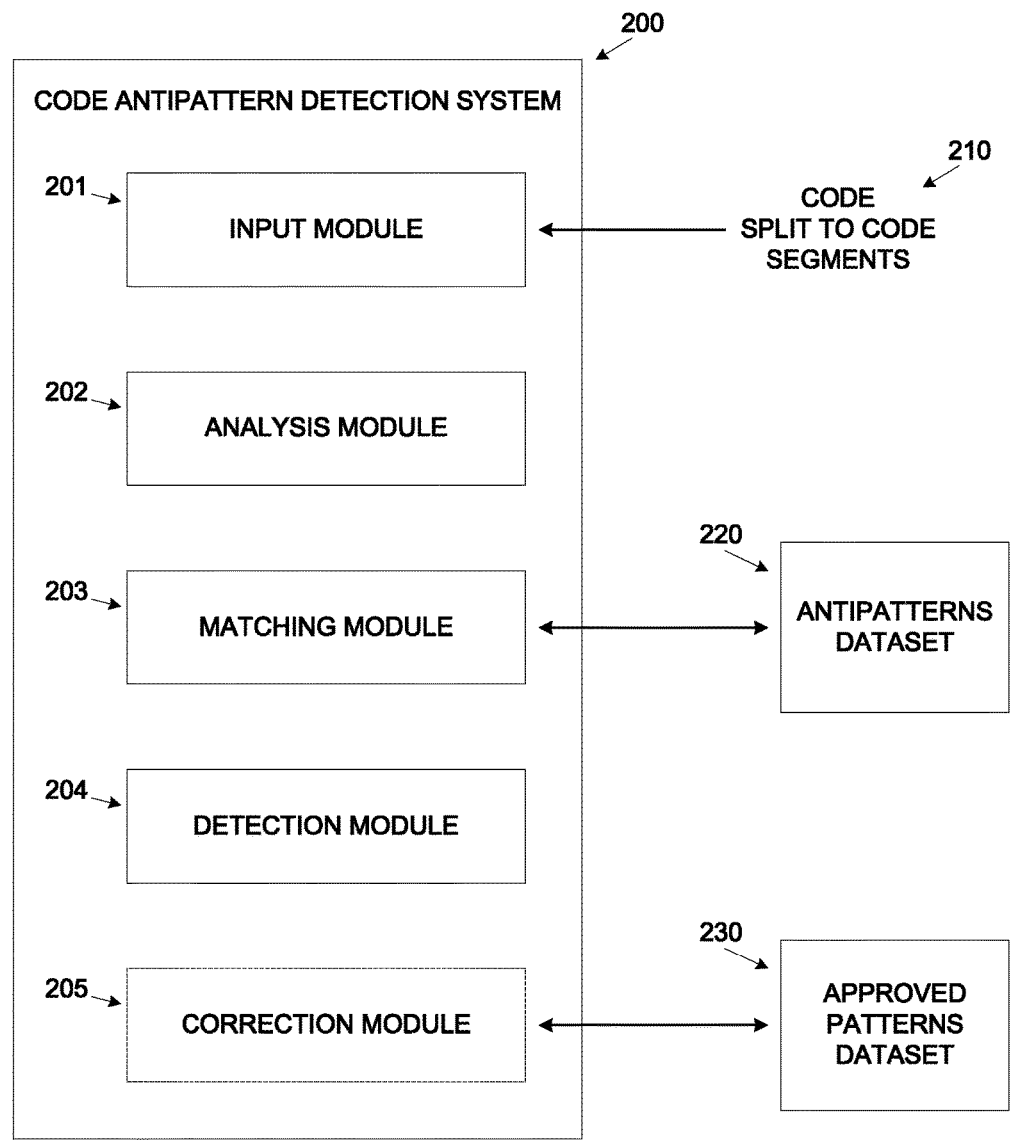
FIG. 2 is a schematic illustration of an exemplary system for detecting antipatterns in a software code, according to some embodiments of the present invention.

Reference is now made to FIG. 2 which is a schematic illustration of an exemplary system for detecting antipatterns in a software code, according to some embodiments of the present invention. An antipatterns detection system 200 includes an input module 201 which receives a software code 210, an analysis module 202, a matching module 203, a detection module 204 and an optional correction module 205. The antipatterns detection process is performed by the system 200 for each of one or more code segments comprising the code 210. Wherein a module refers to a plurality of program instructions stored in a non-transitory medium and executed by a processor.

The input module 201 receives the code 210 which comprises the one or more code segments each including one or more patterns. The input module 201 may consist of a UI, a communication link to communicate with one or more remote servers using the one or more code segments and/or an interface to retrieve the one or more code segments from a non-transitory medium integrated in system 200. The UI may be implemented through a plurality of human-machine interfaces, for example, text interface, graphical user interface (GUI) and/or audio interface. For example, the GUI may present one or more users a visual input/output (I/O) interface displayed on a screen coupled with input devices, such as, keyboard, pointing device, audio input through a microphone and the likes. The analysis module 202 analyzes, through for example, static analysis, each of the one or more code segments and creates an array of features vectors. Each of the features vectors represents one or more predefined features detected in one or more patterns. Each of the one or more predefined features describes a property of the pattern. The array of features vectors is then processed by the matching module 203 which compares each of the features vectors against a plurality of template features vectors stored in a dataset 220 to find a correlation between each features vector and one of the template features vectors. Based on the matching performed by the matching module 203, the detection module 204 determines whether an antipattern is present in the code segment.

One or more of the plurality of template features vectors stored in the dataset 220 may be created using a statistical analysis performed over one or more of a plurality of previous software code packages to characterize antipatterns. In addition, the one or more of the template features vectors may be defined by one or more software programmers. The one or more programmers may define the one or more template features vectors based on, for example, experience, common practices, code review and/or programming tools. The one or more of the template features vectors may be created based on inspection of a history log of the one or more code segments to identify modifications made to the one or more code segments. The modifications may infer of presence of the one or more antipatterns. The inspection may also be done to identify modifications made by two or more programmers to the same one or more code segments which may infer of the presence of an antipattern.

Optionally, the correction module 205 identifies an alternative one or more of a plurality of approved patterns that may be a candidate to replace the one or more antipatterns detected in the code segment. The one or more approved pattern may be stored in an approved patterns dataset 230 which is made available to system 200. The approved patterns stored in the reference approved dataset 230 may be created by one or more software programmers and/or through automated tools. The one or more programmers may define the one or more approved patterns based on, for example, experience, common practices, code review and/or programming tools.

Optionally, the matching module 203 uses one or more matching algorithms, each employing a different method for comparing and/or correlating each of the features vectors with the plurality of template features vectors.

Some embodiments of the present invention are provided by means of examples. An exemplary code segment presenting an exemplary antipattern, probable means for antipattern detection and a recommended approved pattern to replace the antipattern is described in code excerpts 1 and 2. Code excerpt 1 describes a code segment such as a code segment 301 which includes an antipattern that may be detected through the antipattern detection system 200.

Code Excerpt 1:

```
for (x = 0; x < a. length ; x + +) {
/* a not used inside loop */
}
```

The above code segment presents an antipattern which entails a performance penalty due to multiple accesses to the field length during the loop execution while there is no additional accesses to the structure a within the loop. This antipattern may have been detected through one or more predefined features included in an associated features vector, for example, access within a loop, variable immutability and/or field access.

A recommended pattern is described in the code excerpt 2 below.

Code Excerpt 2:

```
len = a. length;
for (x = 0; x < len ; x + +) {
/* a not used inside loop */
}
```

As is shown in the above code segment, the repetitive access to the field length is replaced with a single access to this field and assigning its value to variable len. Within the loop the structure a is no longer accessed and the variable len is used instead. Implementation of the recommended approved pattern removes the performance penalty.

A second exemplary code segment presenting an exemplary antipattern, probable means for antipattern detection and a recommended approved pattern to replace the antipattern is described in code excerpts 3 and 4. Code excerpt 3 describes a code segment such as a code segment 301 which includes an antipattern that may be detected through the antipattern detection system 200.

Code Excerpt 3:

```
function h( ) {
    function g( ) {
        alert (x);
    }
    x = 7; g( );
}
```

The above code segment presents an antipattern in which a global variable x is treated as a local variable. This antipattern may be detected through one or more predefined features included in an associated features vector, for example, AST localization, access to global variables and/or variable initialization within a function.

A recommended pattern is described in the code excerpt 4 below.

Code Excerpt 4:

```
function h( ) {
    function g( ) {
        alert (x);
    }
    var x = 7; g( );
}
```

As is shown in the above code segment, variable x is declared within the function as a local variable.

Figure 3:
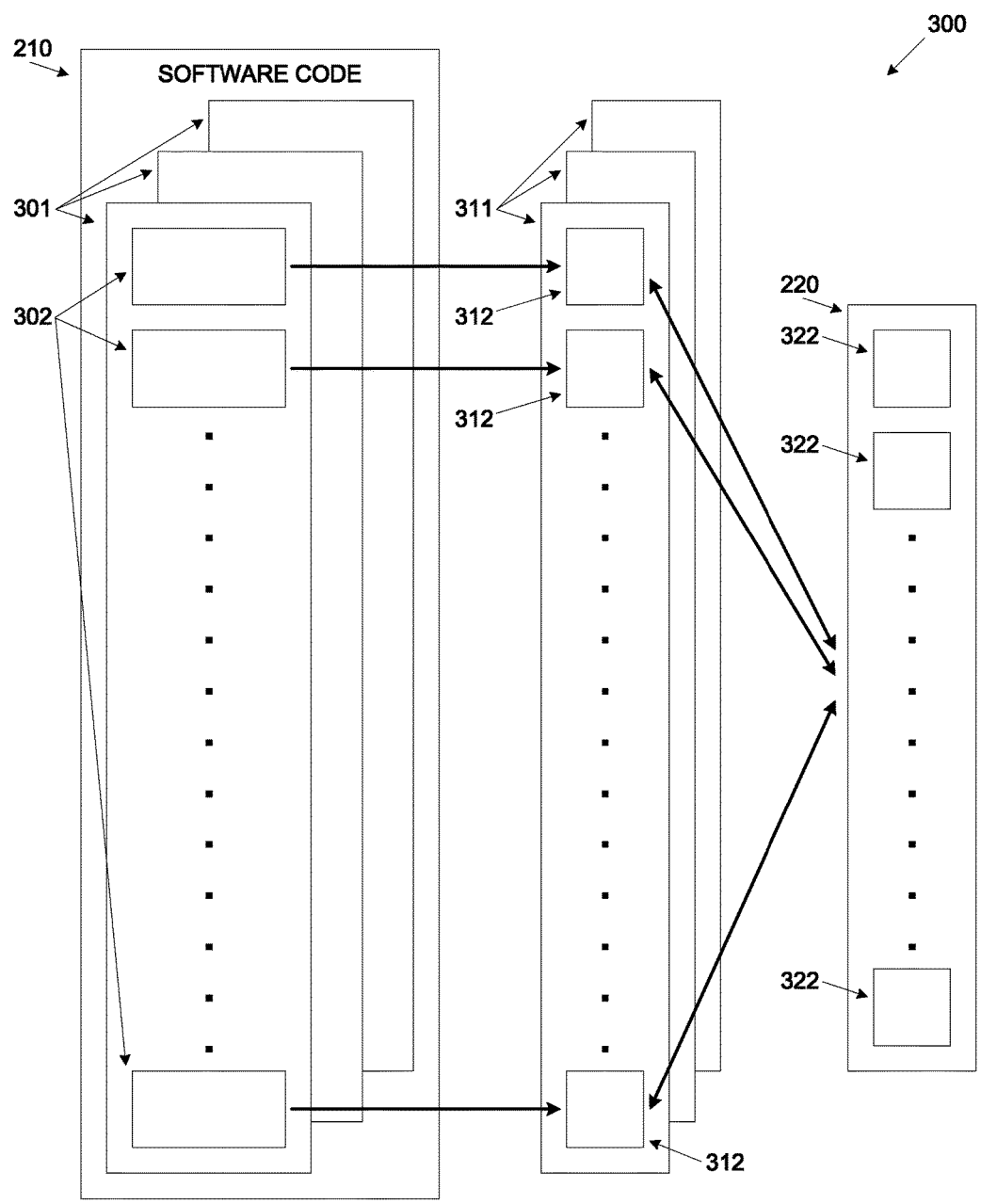
FIG. 3 is a schematic illustration of an exemplary workflow for detecting antipatterns in software code using a system for antipatterns detection, according to some embodiments of the present invention.

Reference is now made to FIG. 3 which is a schematic illustration of an exemplary workflow for detecting antipatterns in software code using a system for antipatterns detection, according to some embodiments of the present invention. An exemplary workflow 300 starts with a software code package such as the software code 210 which is split into one or more of a plurality of code segments 301. Each of the code segments 301 contains one or more patterns 302. Each of the code segments 301 contains one or more of a plurality of patterns 302. Each of the code segments 301 is processed through a system for detecting antipatterns, such as the system 200. The system 200 analyzes each of the one or more patterns 302 within each of the code segment 301 and creates an array 311 associated with each of the code segments 301. Each of the arrays 311 includes one or more of a plurality of features vectors 312 each representing the predefined features detected in a corresponding pattern 302. The system 200 performs a matching sequence in which each of the features vectors 312 is compared against one or more of a plurality of template features vectors 322 stored in an antipatterns dataset such as the antipatterns dataset 220. Based on the correlation detected between each of the one or more features vectors 312 and one of the one or more template features vectors a decision is made whether antipatterns are present or not in the code segment 301.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of generating code free from antipatterns, comprising:
    receiving a code containing at least one of a plurality of code segments, each one of said at least one code segment includes at least one pattern;
    automatically analyzing each one of said at least one code segment to identify a plurality of predefined features of said at least one pattern, each of said plurality of predefined features describing one of a plurality of pattern properties;
    creating at least one array comprising a plurality of features vectors,
        each one of said at least one array is associated with one of said at least one code segment,
        each one of said plurality of features vectors is associated with one of said at least one pattern included in a respective one of said at least one code segment and comprises said plurality of predefined features identified in said respective one of said at least one pattern; and
    generating a new code from said code, by:
        matching each one of said plurality of features vectors of each of said at least one pattern included in said each of said at least one code segment, with a plurality of template features vectors each representing one of a plurality of antipatterns, said plurality of template features vectors is stored in an antipatterns dataset,
        determining a presence or an absence of each of said plurality of antipatterns within said each at least one code segment according to said matching,
        identifying at least one approved pattern, which is not an antipattern, to replace at least one of said plurality of antipatterns detected in said code segment, said at least one approved pattern exhibits a similar functional behavior as said at least one antipattern, and
        automatically replacing said at least one detected antipattern by said at least one identified approved pattern;
    wherein each of said plurality of pattern properties is a member in a group consisting of: number of fields involved in said pattern, type of fields involved in said pattern, number of methods said pattern spans, number of Abstract Syntax Tree (AST) nodes involved in said pattern, type of AST nodes involved in said pattern, frameworks involved in said pattern, designated scope of said pattern, reachability from an enclosing scope of said pattern, global variables use, variable initialization states and escaped variables.

2. The method of claim 1, wherein said at least one approved pattern is retrieved from an approved patterns dataset comprising at least one approved pattern.

3. The method of claim 1, further comprising at least one of said plurality of template features vectors is created through statistical analysis of a plurality of previous patterns having functional characteristics similar to said at least one pattern, said plurality of previous patterns is stored in a previous patterns dataset.

4. The method of claim 1, further comprising at least one of said plurality of template features vectors is created using feedback of at least one other software developer who performed code review over said at least one pattern and identifies at least one of said plurality of antipatterns.

5. The method of claim 1, further comprising at least one of said plurality of template features vectors is created through analysis of a log which holds a history of at least one of a plurality of changes performed to said at least pattern in order to determine whether said at least one pattern is an antipattern.

6. The method of claim 1, further comprising at least one of said plurality of template features vectors is created through analysis of a log that holds a history of at least one of a plurality of changes made to said at least one pattern by at least two software developers to determine whether said at least one pattern is an antipattern.

7. The method of claim 1, further comprising said matching employs voting between at least one matching algorithms, each of said at least one matching algorithms employs a different method of comparing said each features vector with said plurality of template features vectors.

8. The method of claim 1, further comprising providing an indication to notify a user of said replacing.

9. The method of claim 8, wherein said indication includes marking at least one of said at least one detected antipattern and said at least one identified approved pattern.

10. A system for generating code free from antipatterns, comprising:
    an interface for communicating with a user;
    a program store storing a code; and
    a processor coupled to the first interface and the program store for implementing the stored code, the code comprising:
        code instructions for receiving a code having a plurality of code segments, each one of said plurality of code segments includes at least one pattern, said code is received according to a user input received via said interface;
        code instructions for automatically analyzing each one of said plurality of code segments to identify a plurality of predefined features of said at least one pattern, each of said plurality of predefined features describing one of a plurality of pattern properties;
        code instructions for creating at least one array consisting of a plurality of features vectors, each one of said at least one array is associated with one of said plurality of code segments, each one of said plurality of features vectors is associated with one of said at least one pattern included in a respective one of said plurality of code segments and comprises said plurality of predefined features identified in said respective one of said at least one pattern; and
        code instructions for generating a new code from said code, by:
            comparing each one of said plurality of features vectors of each of said at least one pattern included in said each of said at least one code segment, with a plurality of template features vectors each representing one of a plurality of antipatterns, said plurality of template features vectors is stored in an antipatterns dataset,
            determining a presence or an absence of at least one of said plurality of antipatterns within said each code segments according to said compare,
            identifying at least one approved pattern, which is not an antipattern, to replace at least one of said plurality of antipatterns detected in said code segment, said at least one approved pattern exhibits a similar functional behavior as said at least one antipattern, and automatically replacing said at least one detected antipattern by said at least one identified approved pattern;

wherein each of said plurality of pattern properties is a member in a group consisting of: number of fields involved in said pattern, type of fields involved in said pattern, number of methods said pattern spans, number of Abstract Syntax Tree (AST) nodes involved in said pattern, type of AST nodes involved in said pattern, frameworks involved in said pattern, designated scope of said pattern, reachability from an enclosing scope of said pattern, global variables use, variable initialization states and escaped variables.

11. The system of claim 10, wherein said at least one approved pattern is retrieved from an approved patterns dataset comprising at least one approved pattern.

12. The system of claim 10, further comprising said processor is adapted for implementing the following code instructions in said code stored:

code instructions for creating at least one of said plurality of template features vectors through statistical analysis of a plurality of previous patterns having functional characteristics similar to said at least one pattern, said plurality of previous patterns is stored in a previous patterns dataset.

13. The system of claim 12, further comprising said processor is adapted for implementing the following code instructions in said code stored:

code instructions for creating said at least one template features vectors using feedback of at least one other software developer who performed code review over said at least one pattern and identifies said at least one antipattern.

14. The system of claim 12, further comprising said processor is adapted for implementing the following code instructions in said code stored:

code instructions for creating said at least one template features vectors through analysis of a log which holds a history of at least one of a plurality of changes performed to said at least one pattern in order to determine whether said at least one pattern is an antipattern.

15. The system of claim 12, further comprising said processor is adapted for implementing the following code instructions in said code stored:

code instructions for creating said at least one template features vectors through analysis of a log which holds a history of at least one of a plurality of changes made to said at least one pattern by at least two software developers to determine whether said at least one pattern is an antipattern.

16. A computer program product for degenerating code free from antipatterns, comprising:

a non-transitory computer readable storage medium;

first program instructions to receive a code that includes at least one of a plurality of code segments, each one of said at least one code segments includes at least one pattern;

second program instructions to analyze each one of said plurality of code segments to identify a plurality of predefined features of said at least one pattern;

third program instructions to create at least one array consisting of a plurality of features vectors, each one of said at least one array is associated with one of said plurality of code segments, each one of said plurality of features vectors is associated with one of said at least one pattern included in a respective one of said plurality of code segments and comprises said plurality of predefined features identified in said respective one of said at least one pattern; and fourth program instructions to generate a new code from said code, by:

matching each one of said plurality of features vectors of each of said at least one pattern included in said each of said plurality of code segments, with a plurality of template features vectors each representing one of a plurality of antipatterns, said plurality of template features vectors is stored in an antipatterns dataset, determining a presence or an absence of each of said plurality of antipatterns within said each at least one code segments according to said match, calculating at least one approved pattern, which is not an antipattern, to replace at least one of said plurality of antipatterns detected in said code segment, said at least one approved pattern exhibits a similar functional behavior as said at least one antipattern, and automatically replace said at least one detected antipattern by said at least one calculated approved pattern;

wherein said first, second, third and fourth program instructions are stored on said non-transitory computer readable storage medium;

wherein each of said plurality of pattern properties is a member in a group consisting of: number of fields involved in said pattern, type of fields involved in said pattern, number of methods said pattern spans, number of Abstract Syntax Tree (AST) nodes involved in said pattern, type of AST nodes involved in said pattern, frameworks involved in said pattern, designated scope of said pattern, reachability from an enclosing scope of said pattern, global variables use, variable initialization states and escaped variables.

17. The computer program product of claim 16, wherein said at least one approved pattern is retrieved from an approved patterns dataset comprising at least one approved pattern.

18. The computer program product of claim 16, further comprising a eighth program instruction to create at least one of said plurality of template features vectors through statistical analysis of a plurality of previous patterns having functional characteristics similar to said at least one pattern, said plurality of previous patterns is stored in a previous patterns dataset, wherein said eighth program instruction is stored on said non-transitory computer readable storage medium.

19. The computer program product of claim 18, further comprising said code instructions for creating said at least one template features vectors uses feedback of at least one other software developer who performed code review over said at least one pattern.

20. The computer program product of claim 18, further comprising said code instructions for creating said at least one template features vectors analyzes a log which holds a history of at least one of a plurality of changes performed to said at least one pattern in order to determine whether said at least one pattern is an antipattern.

21. The computer program product of claim 18, further comprising said code instructions for creating said at least one template features vectors analyzes a log which holds a history of at least one of a plurality of changes made to said at least one pattern by at least two software developers to determine whether said at least one pattern is an antipattern.

22. The computer program product of claim 16, further comprising said third program instructions employs voting between at least one matching algorithms, each of said at least one matching algorithms employs a different method of comparing said each features vector with said plurality of template features vectors.

\* \* \* \* \*